(12) United States Patent
Awazu

(10) Patent No.: US 9,709,875 B2
(45) Date of Patent: Jul. 18, 2017

(54) ELECTRIC CONTACT DEVICE, LENS UNIT, AND IMAGING DEVICE

(71) Applicant: FUJIFILM Corporation, Tokyo (JP)

(72) Inventor: Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/957,326

(22) Filed: Dec. 2, 2015

(65) Prior Publication Data
US 2016/0085138 A1    Mar. 24, 2016

Related U.S. Application Data

(63) Continuation of application No. PCT/JP2014/064704, filed on Jun. 3, 2014.

(30) Foreign Application Priority Data

Jun. 21, 2013    (JP) .................................. 2013-131148

(51) Int. Cl.
*G03B 17/14*    (2006.01)
*H01R 12/59*    (2011.01)
(Continued)

(52) U.S. Cl.
CPC ............. *G03B 17/14* (2013.01); *H01R 12/59* (2013.01); *H01R 12/714* (2013.01); *H01R 13/24* (2013.01);
(Continued)

(58) Field of Classification Search
None
See application file for complete search history.

(56) References Cited

U.S. PATENT DOCUMENTS 4,420,239 A * 12/1983 Yasuyuki ............... G03B 17/14
359/828
4,939,532 A    7/1990 Takebayashi
(Continued)

FOREIGN PATENT DOCUMENTS

JP    61-147240 A    7/1986
JP    4-67662 A    3/1992
(Continued)

OTHER PUBLICATIONS

English translation of International Preliminary Report on Patentability (Form PCT/IPEA/409) for PCT/JP2014/064704.
(Continued)

*Primary Examiner* — Rochelle-Ann J Blackman
(74) *Attorney, Agent, or Firm* — Birch, Stewart, Kolasch & Birch, LLP

(57) ABSTRACT

An electric contact device includes a flexible printed circuit board on which a conductive pattern is formed, a contact member, a base, a coil spring, a support member, and a guide. The contact member comes into direct contact with the flexible printed circuit board and is electrically connected to the conductive pattern. The base includes a hole that holds the contact member so as to allow the contact member to be displaced between a protruding position where the contact member protrudes and a retracted position. The coil spring allows the flexible printed circuit board to come into contact with the contact member when one end thereof biases the flexible printed circuit board. The support member supports the other end of the coil spring. The guide is formed by a guide groove of the base and a guide groove of the support member and guides the extension and contraction of the coil spring.

14 Claims, 10 Drawing Sheets

(51) Int. Cl.
    *H04N 5/225*     (2006.01)
    *H04N 5/232*     (2006.01)
    *H04N 5/235*     (2006.01)
    *H01R 12/71*     (2011.01)
    *H01R 13/24*     (2006.01)

(52) U.S. Cl.
    CPC ......... *H04N 5/2254* (2013.01); *H04N 5/2353* (2013.01); *H04N 5/23212* (2013.01); *G03B 2206/00* (2013.01); *G03B 2217/002* (2013.01)

(56) References Cited

U.S. PATENT DOCUMENTS

| | | |
|---|---|---|
| 5,404,190 A | 4/1995 | Kohno et al. |
| 2004/0176661 A1 | 9/2004 | Futatsugi |
| 2010/0111517 A1 | 5/2010 | Yasuda |

FOREIGN PATENT DOCUMENTS

| | | |
|---|---|---|
| JP | 6-294990 A | 10/1994 |
| JP | 10-51117 A | 2/1998 |
| JP | 11-327022 A | 11/1999 |
| JP | 2002-63728 A | 2/2002 |
| JP | 2004-191689 A | 7/2004 |
| JP | 2009-288336 A | 12/2009 |
| JP | 4901811 B2 | 3/2012 |

OTHER PUBLICATIONS

International Preliminary Report on Patentability (PCT/IPEA/409 & PCT/IPEA/416) for PCT/JP2014/064704 mailed on Jun. 12, 2015.

International Search Report for PCT/JP2014/064704 mailed on Aug. 26, 2014.

Written Opinion of the International Searching Authority for PCT/JP2014/064704 mailed on Aug. 26, 2014.

\* cited by examiner

FIG. 8
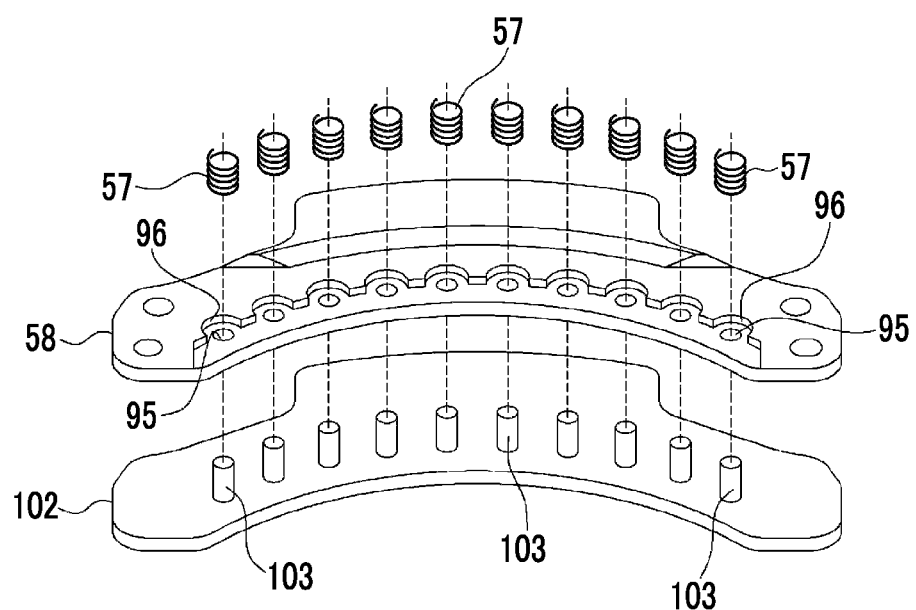
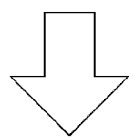
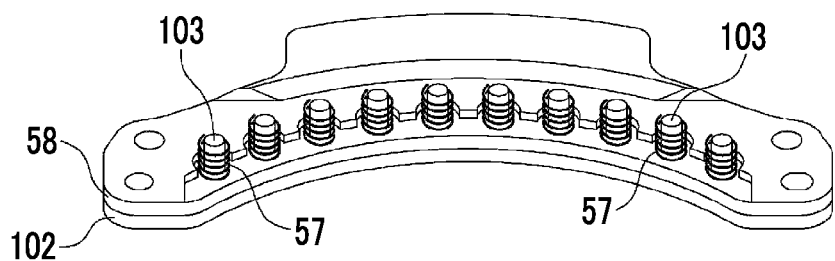

ELECTRIC CONTACT DEVICE, LENS UNIT, AND IMAGING DEVICE

CROSS-REFERENCE TO RELATED APPLICATIONS

This application is a Continuation of PCT International application Ser. No. PCT/JP2014/064704 filed on Jun. 3, 2014, which claims priority under 35 U.S.C. §119(a) to Japanese Patent Application No. 2013-131148 filed Jun. 21, 2013. The above application is hereby expressly incorporated by reference, in its entirety, into the present application.

BACKGROUND OF THE INVENTION

1. Field of the Invention

The present invention relates to an electric contact device that electrically connects a camera body to a replaceable lens unit, a lens unit that includes an electric contact device, and an imaging device.

2. Description Related to the Prior Art

A digital camera which includes a camera body and a lens unit and of which the lens unit can be replaced has been applied. The camera body is provided with an imaging element and a control circuit board for controlling each part such as the imaging element, and a lens mount on which the lens unit is mounted is provided on the front surface thereof. The lens unit is a unit in which lenses, a diaphragm, an optical filter, and the like are integrated.

Further, a digital camera, which automatically adjusts exposure or performs focusing, has been applied in recent years. In a digital camera that performs automatic exposure control and automatic focusing, a control circuit board is provided not only in a camera body but also in a lens unit. The control circuit board of the lens unit is connected to the camera body through an electric contact device provided in a lens mount; transmits/receives control signals, which are used for the automatic exposure control and the automatic focusing, to/from the camera body; and controls the position of a lens and the aperture of a diaphragm.

For example, an electric contact device that includes a board on which a conductive pattern is formed, a contact member that is fixed to the board by being caulked to a hole formed in the board, a base that holds the contact member so as to allow the contact member to be displaced between a protruding position and a retracted position, a biasing member that biases the board in a direction in which the board comes into pressure contact with the contact member, and a support member that supports the biasing member (Japanese Patent No. 4901811) is known as an electric contact device that connects a lens unit to a camera body.

Since the biasing members are supported by only the support member in the electric contact device disclosed in Japanese Patent No. 4901811, there is a problem in that a gap is formed between the biasing member and an inner wall (a part of the base) of the electric contact device adjacent to the biasing member. For example, when the electric contact device disclosed in Japanese Patent No. 4901811 is disposed in the camera body so as to be parallel to a mounting surface, a distance between the contact member and the side wall of the mounted lens unit is increased by a gap between the biasing member and the inner wall of the electric contact device. For this reason, since a lens having a small diameter should be used as a lens (particularly, a lens closest to the imaging element) used in, for example, the lens unit, the design of the lens is limited.

Further, the contact member is fixed to the board in the electric contact device disclosed in Japanese Patent No. 4901811. However, since the distance between the contact member and the side wall of the mounted lens unit is long, fixed portions are loosened due to the mounting/detachment of the lens unit on/from the lens mount, the load of the lens unit while the lens unit is mounted on the lens mount, or the like. For this reason, since connection becomes unstable with time, there is a case in which automatic exposure control and automatic focusing cannot be performed normally. Particularly, when caulking is loosened in a case in which the contact member is fixed to the board by caulking and the biasing member is supported by only the support member, the biasing member is shaken due to the gap between the biasing member and the inner wall of the base and, for example, the biasing member bends in the middle thereof. For this reason, instability is further caused.

SUMMARY OF THE INVENTION

An object of the present invention is to provide an electric contact device in which a distance between a contact member and the side surface of a lens unit is short, a camera body including the electric contact device, a lens unit, and an imaging device.

An electric contact device of the present invention electrically connects a camera body to a lens unit, and includes a flexible printed circuit board, a contact member, a base, a biasing member, a support member, and a guide. A conductive pattern is formed on the flexible printed circuit board, and the contact member comes into direct contact with the flexible printed circuit board and is electrically connected to the conductive pattern. A surface of the contact member that comes into contact with the flexible printed circuit board is a curved surface. The base includes a first hole that holds a first end portion of the contact member so as to allow the first end portion of the contact member to be displaced between a protruding position where the first end portion protrudes and a retracted position where the first end portion is retracted. The biasing member has elasticity so as to be extended and contracted between a first end thereof and a second end thereof, and the first end of the biasing member biases the flexible printed circuit board such that the flexible printed circuit board is bent along the curved surface of the contact member and comes into contact with a second end portion of the contact member. The support member supports the second end of the biasing member. The guide is composed of a first groove formed on the base and a second groove formed on the support member, and guides the extension and contraction of the biasing member.

It is preferable that the contact member includes a shaft portion to be inserted into the first hole, the first end portion of the contact member has a diameter smaller than a diameter of the first hole and is formed at a first end of the shaft portion, and the second end portion of the contact member has a diameter larger than the diameter of the first hole and is formed at a second end of the shaft portion.

Further, it is preferable that each of the first and second grooves has a semi-cylindrical shape. It is preferable that the first and second grooves surround an outer periphery of the biasing member close to the second end of the biasing member, and the flexible printed circuit board is inserted into a gap between the contact member and the biasing member through a gap between the second groove and the base.

It is preferable that the biasing member is a coil spring, the support member is fixed to the base, and the support member is provided with a second hole, which has a diameter smaller than a diameter of the biasing member, at a center of the first and second grooves surrounding an outer periphery of the biasing member close to the second end of the biasing member.

It is preferable that the biasing member is a coil spring, the support member is fixed to the base, and the support member is provided with a protrusion portion, which locks the coil spring, at a center of the first and second grooves surrounding an outer periphery of the biasing member close to the second end of the biasing member.

It is preferable that a plurality of the first holes, a plurality of the contact members, a plurality of the biasing members, a plurality of the first grooves, and a plurality of the second grooves are provided, and the flexible printed circuit board includes a plurality of terminals provided so as to correspond to the respective contact members, a plurality of arm portions connected to the respective terminals, and a base portion to which the respective arm portions are commonly connected.

It is preferable that the support member is fixed to the base at first and second fixing portions positioned so as to sandwich an arrangement region in which the first holes are arranged therebetween in one direction, and a straight line connecting the first and second fixing portions passes through the arrangement region.

It is preferable that the base is formed integrally with a light blocking frame provided on the camera body.

It is preferable that the lens unit has a cylindrical shape and the first holes are arranged in an arc shape along an outer periphery of the lens unit.

It is preferable that the surface is a convex surface protruding toward the flexible printed circuit board and a recessed portion is formed at an apex of the convex surface.

It is preferable that the support member is made of a transparent material.

A lens unit of the present invention includes an electric contact device for electrical connection with a camera body, and the electric contact device includes a contact member, a base, a biasing member, a support member, and a guide.

An imaging device of the present invention includes an electric contact device that electrically connects a camera body to a lens unit. The electric contact device of the camera body or the lens unit includes a contact member, a base, a biasing member, a support member, and a guide.

In the invention, the electric contact device has a structure in which the guide is formed by the guide groove of the base and the guide groove of the support member and the extension and contraction of the coil spring are guided by the guide. Accordingly, a distance between the contact member and the lens unit is short.

BRIEF DESCRIPTION OF DRAWINGS

For more complete understanding of the present invention, and the advantage thereof, reference is now made to the subsequent descriptions taken in conjunction with the accompanying drawings, in which:

FIG. 8 is a perspective view showing an assembly jig;

DESCRIPTION OF THE PREFERRED EMBODIMENTS

Figure 1:
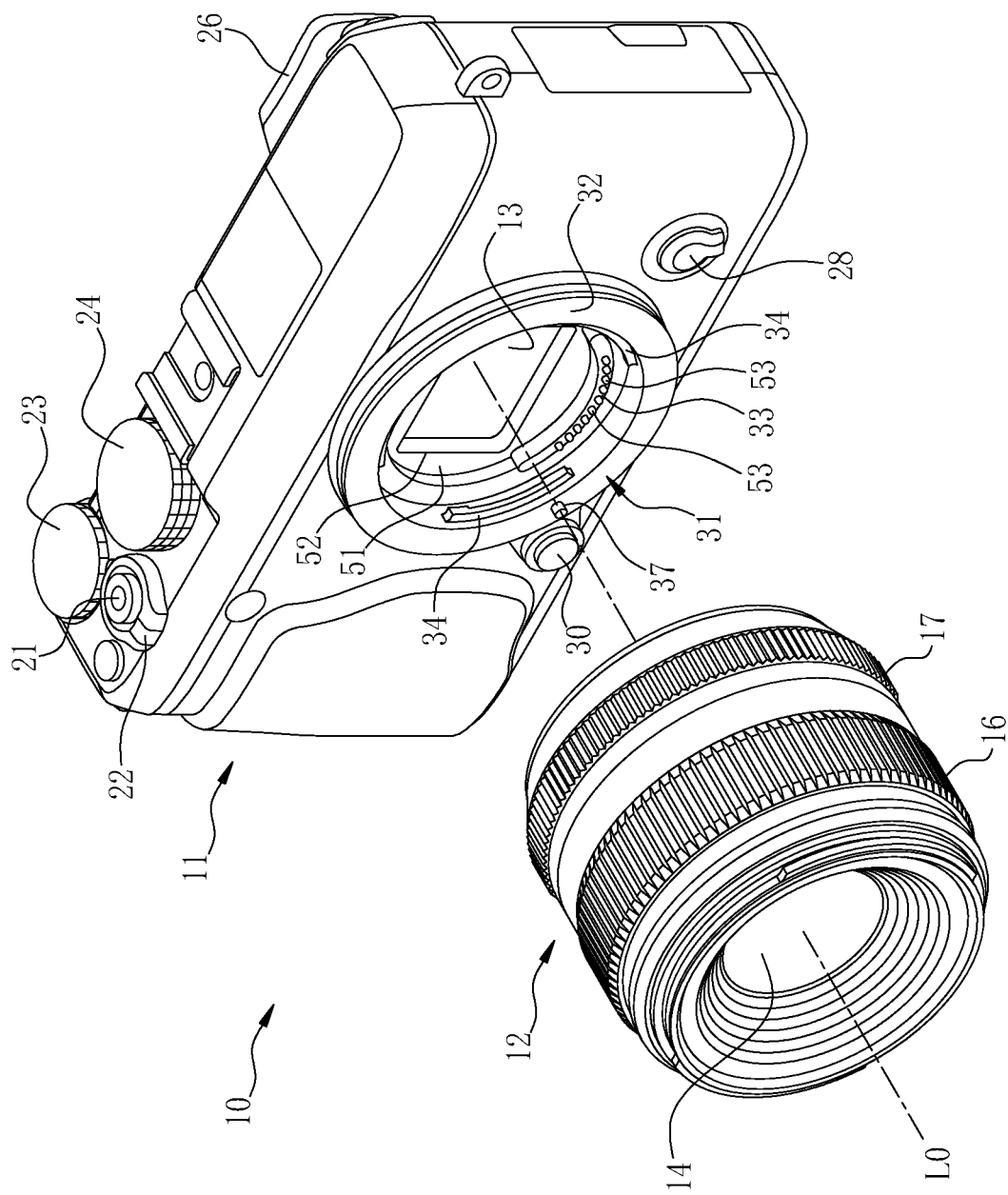
FIG. 1 is a perspective view of an imaging device.
Figure 2:
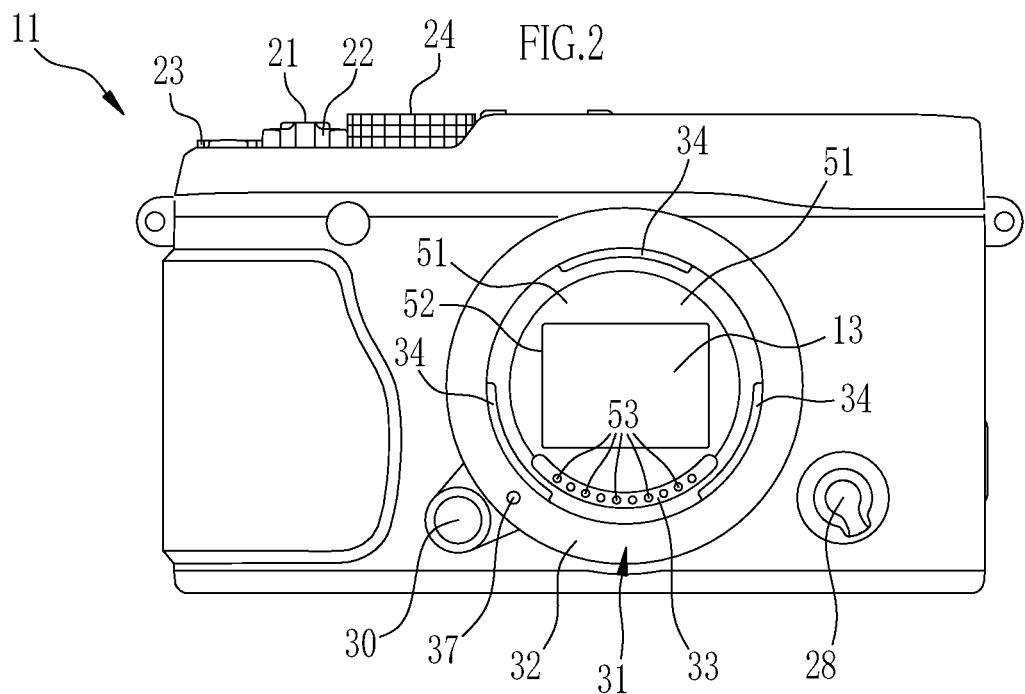
FIG. 2 is a front view of a camera body.
Figure 3:
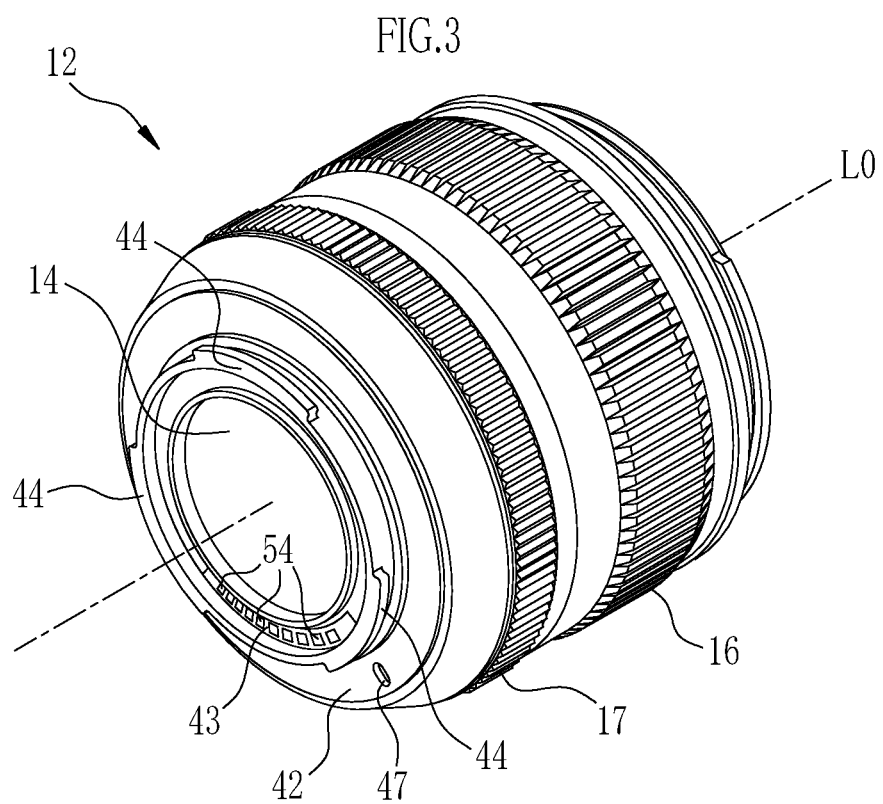
FIG. 3 is a rear perspective view of a lens unit.

As shown in FIGS. 1 to 3, an imaging device 10 includes a camera body 11 and a cylindrical lens unit 12. The camera body 11 is a body of the imaging device 10 into which an imaging element 13 and a control circuit board (not shown) for controlling each part such as the imaging element 13 are built. The lens unit 12 includes a plurality of lenses 14 that form an image of a subject on the imaging element 13, a diaphragm (not shown) of which the aperture is variable, an optical filter, and the like. Manual focusing or a zoom operation of the lens unit 12 can be performed by the rotation of a focus ring 16 or a zoom ring 17. Further, the lens unit 12 is adapted to be capable of performing automatic exposure control and automatic focusing on the basis of a control signal output from the camera body 11, and a control circuit board (not shown) for the automatic exposure control and the automatic focusing is built into the lens unit 12.

Various operating parts, such as an imaging instruction input part 21 used to input an imaging instruction, a power operating part 22 used to turn on/off power, an exposure operating part 23 used to set an exposure, and a shutter speed operating part 23 used to set a shutter speed, are provided on the upper surface of the camera body 11. In the imaging device 10, the automatic exposure control can be selected by the exposure operating part 23.

Further, various operating parts (not shown), such as an electronic viewfinder 26, a monitor (not shown), and buttons used to operate the imaging device 10, are provided on the rear surface of the camera body 11.

A focus mode switching part 28 used to switch focus modes, a lens mount 31 on which the lens unit 12 is mounted, and an attachment/detachment button 30 are provided on the front surface of the camera body 11. The imaging device 10 has a manual focus mode in which focusing is manually performed and an automatic focusing (AF) mode in which focusing is automatically performed as focus modes, and can select any one of the focus modes.

The lens mount 31 is a bayonet type. When the lens unit 12 is to be mounted, a mounting surface 42 of the lens unit 12 comes into contact with a mounting surface 32 of the camera body 11 while the lens unit 12 is rotated about an optical axis L0 so that bayonet claws 34 and 44 of the lens mount 31 and the lens unit 12 do not interfere with each other. After that, when the lens unit 12 is rotated so that the bayonet claws 34 and 44 are engaged with each other, a locking convex portion 37 is fitted to a recessed portion 47. Accordingly, the rotation of the lens unit 12 is locked and the lens unit 12 is fixed to the camera body 11. When the lens unit 12 is mounted on the camera body 11 in this way, electric contact devices 33 and 43 present at positions corresponding to each other come into contact with each other and a control circuit board of the camera body 11 and a control circuit board of the lens unit 12 are electrically connected to each other.

The locking convex portion 37 is provided so as to be capable of being displaced between a protruding position and a retracted position in a direction perpendicular to the mounting surface 32, and is moved to the retracted position by an operation of pressing the attachment/detachment button 30. For this reason, when the attachment/detachment button 30 is pressed and the lens unit 12 mounted on the lens mount 31 is rotated, the lens unit 12 can be removed from the camera body 11.

A base 51 is provided at the back of the lens mount 31, and an opening 52 through which an imaging surface of the imaging element 13 is exposed is provided at the base 51. The base 51 is made of an opaque material, and functions as a light blocking frame (light blocking member) that blocks light unnecessary for imaging. Further, a central portion, which is provided with the opening 52, of the base 51 is recessed to the rear side (a side where the imaging element 13 is present) of the camera body 11. Accordingly, when the lens unit 12 is mounted on the lens mount 31, a part of the rear side of the lens unit 12 is fitted to the central portion, which is recessed, of the base 51.

Since the electric contact device 33 is formed integrally with the base 51, the base 51 is also one component that forms the electric contact device 33. The electric contact device 33 includes pin-shaped contact members 53, and the base 51 functions as a holding member that holds these contact members 53 so as to allow the contact members 53 to be displaced between a protruding position and a retracted position. The protruding position is a position where one end (tip) of the contact member 53 protrudes toward the lens unit 12 from the base 51, and the retracted position is a position where one end of the contact member 53 is retracted to the base 51 in comparison with the protruding position. One end of the contact member 53 can be retracted up to the surface of the base 51. When one end of each contact member 53 is retracted up to the surface of the base 51, all of the contact members 53 are fitted to the base 51. When the contact members 53 are biased to the protruding position as described below and the lens unit 12 is mounted on the camera body 11, one end of each contact member 53 comes into pressure contact with a corresponding contact 54 of the electric contact device 43 and is electrically connected to the corresponding contact 54.

The number of (for example, ten) the contact members 53 provided on the camera body 11 is the same as that of the contacts 54 provided on the lens unit 12, and the contact members 53 and the contacts 54 are provided at positions corresponding to each other. The contact members 53 are connected to the control circuit board built into the camera body 11, and the contacts 54 are connected to the control circuit board built into the lens unit 12. The imaging device 10 transmits and receives control signals between the respective control circuit boards of the camera body 11 and the lens unit 12 through the electrical connection between the contact members 53 and the contacts 54 to perform the automatic exposure control and the automatic focusing.

Figure 4:
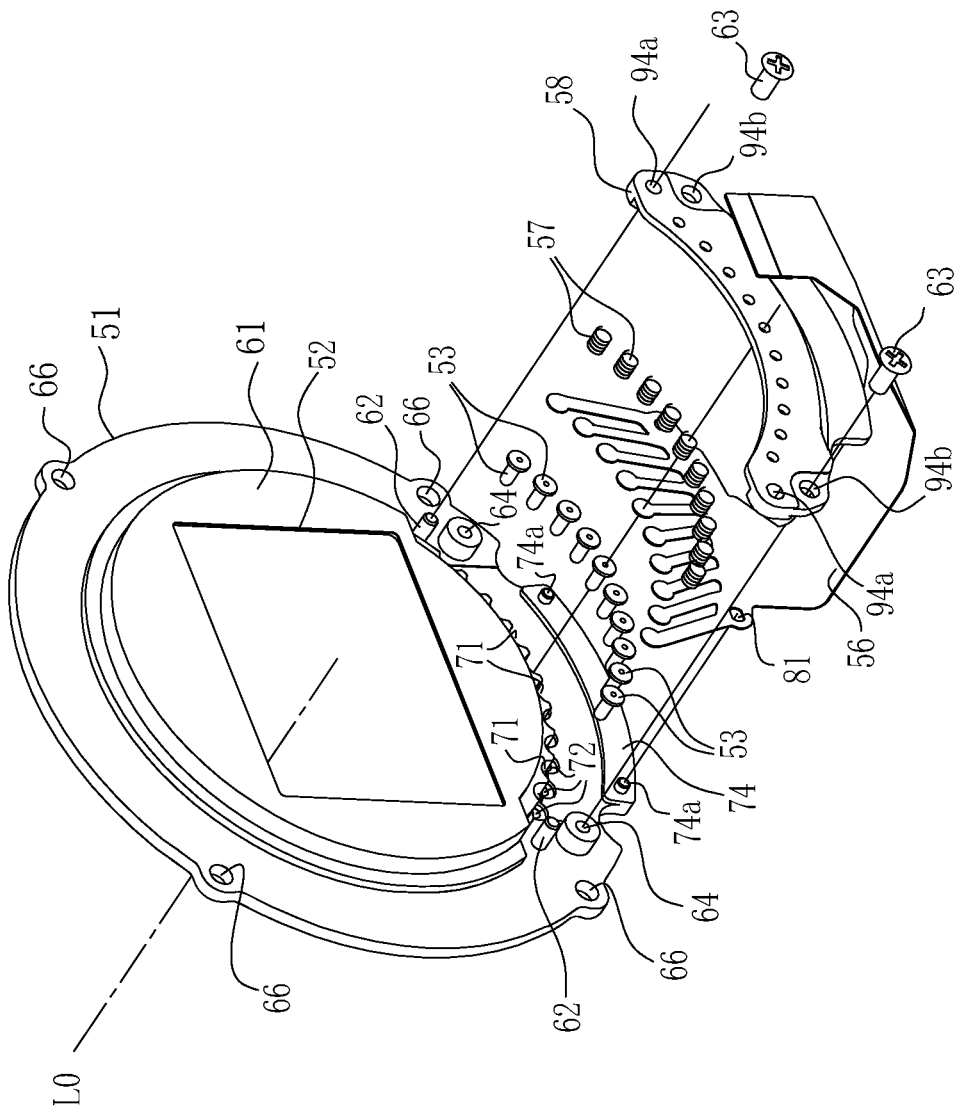
FIG. 4 is an exploded perspective view of an electric contact device.

As shown in FIG. 4, the electric contact device 33 includes the base 51, the contact members 53, a flexible printed circuit board 56, coil springs 57 (biasing members), and a support member 58.

A convex portion 61, which protrudes toward the inside of the camera body 11 (to the imaging element 13), is provided on the rear surface of the base 51, and the opening 52 is formed at the center of the convex portion 61. The convex portion 61 is recessed toward the inside of the camera body 11 when the base 51 is viewed from the front side (front of the camera body 11). Two locking pins 62 that are used to lock the support member 58 and two screw holes 64 that are used to fix the support member 58 by screws 63 are provided at the peripheral edge portion of the convex portion 61. Through holes 66, which are formed at the peripheral edge portion of the base 51, are used to fix the base 51 and a member, which forms the mounting surface 32, to the camera body 11 by screwing.

Figure 5:
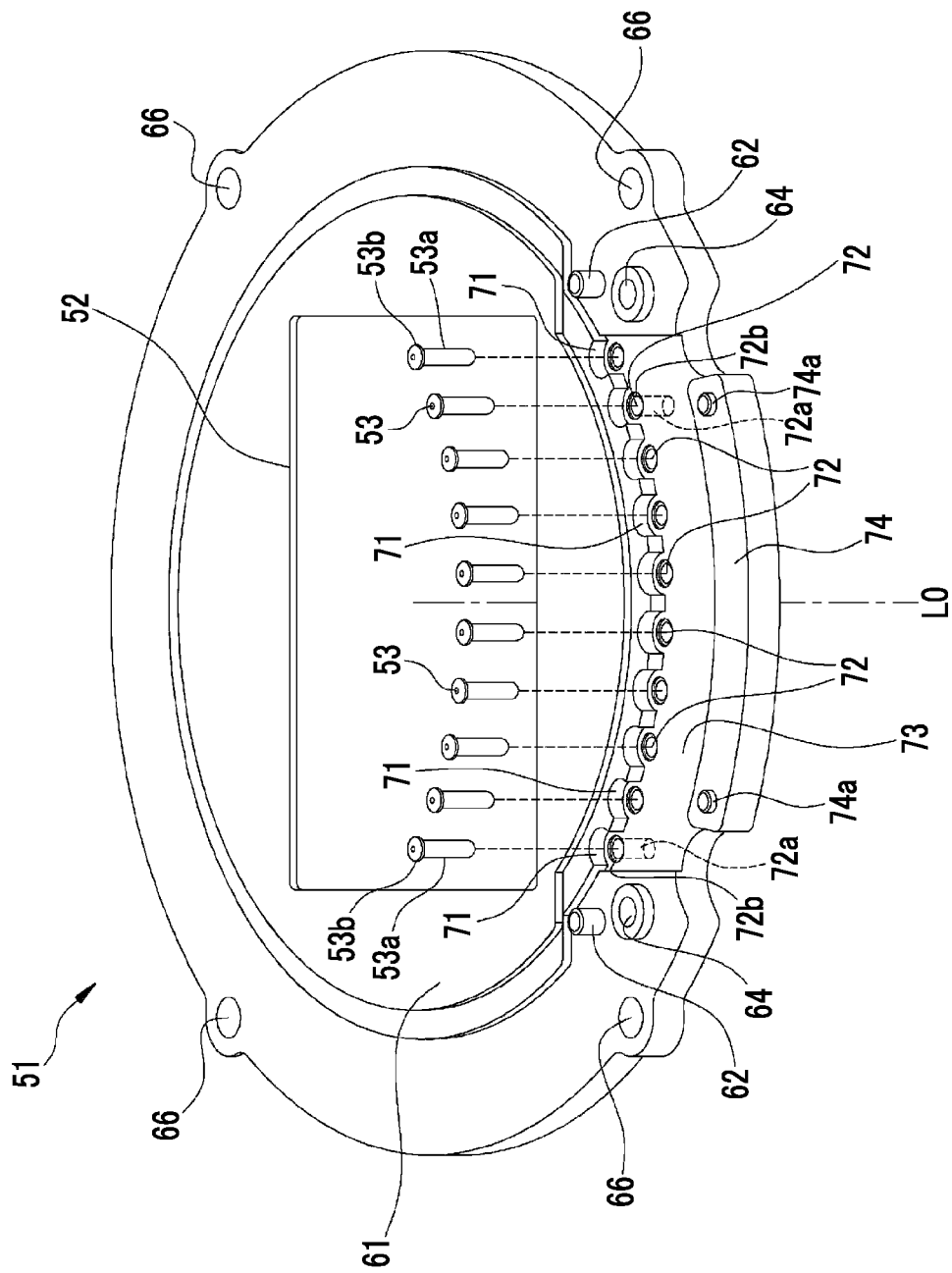
FIG. 5 is a rear perspective view of a base.

As shown in FIGS. 4 and 5, semi-cylindrical guide grooves 71 (first grooves) and holes 72 (first holes) into which the contact members 53 are inserted are arranged in an arc shape along the outer periphery of the lens unit 12 and the outer peripheral portion of the convex portion 61. The guide grooves 71 are formed on the outer wall of the convex portion 61 so as to correspond to the disposition of the holes 72, and form guides 99 (see FIG. 9) that guide the extension and contraction of the coil springs 57 in a direction perpendicular to the surface of the base 51. The guide groove 71 is formed over the entire length of the coil spring 57. For this reason, the guide groove 71 guides the extension and contraction of the coil spring 57 over the entire length thereof by at least a part of the side surface.

The holes 72 hold the contact members 53 so as to allow the contact members 53 to be displaced between the protruding position and the retracted position. Specifically, the contact member 53 includes a shaft portion 53a, and a base end portion 53b of which the diameter is larger than the diameter of the shaft portion 53a. For this reason, the hole 72 is formed so as to have two diameters according to the shape of the contact member 53, and includes a through hole 72a which passes through the base 51 and into which the shaft portion 53a is inserted and a groove 72b of which the diameter is larger than the diameter of the through hole 72a. Accordingly, even when the contact member 53 is inserted into the hole 72 and one end of the contact member 53 (the tip of the shaft portion 53a opposite to the base end portion 53b) is made to protrude from the base 51 so that the contact member 53 is disposed at the protruding position, the contact member 53 is locked to the groove 72b of the hole 72 at the base end portion 53b without falling out of the base 51.

Further, the holes 72 are formed in a recessed portion 73 that is formed to be lower than the peripheral edge portion of the base 51, in which the locking pins 62 and the screw holes 64 are provided, by one step. The recessed portion 73 forms a space, in which the flexible printed circuit board 56 is to be displaced, between the support member 58 and itself. For this reason, when each of the contact members 53 is displaced between the protruding position and the retracted position, the flexible printed circuit board 56 can be smoothly displaced in the recessed portion 73 while being electrically connected to the contact members 53.

Protrusions 74a, which are used to lock the flexible printed circuit board 56, are provided on a convex portion 74 that is formed at the edge of the recessed portion 73, and the flexible printed circuit board 56 is interposed between the protrusions 74a and the support member 58. For example, the convex portion 74 is formed so as to be flush with the peripheral edge portion of the base 51 in which the locking pins 62 and the screw holes 64 are provided.

Figure 6:
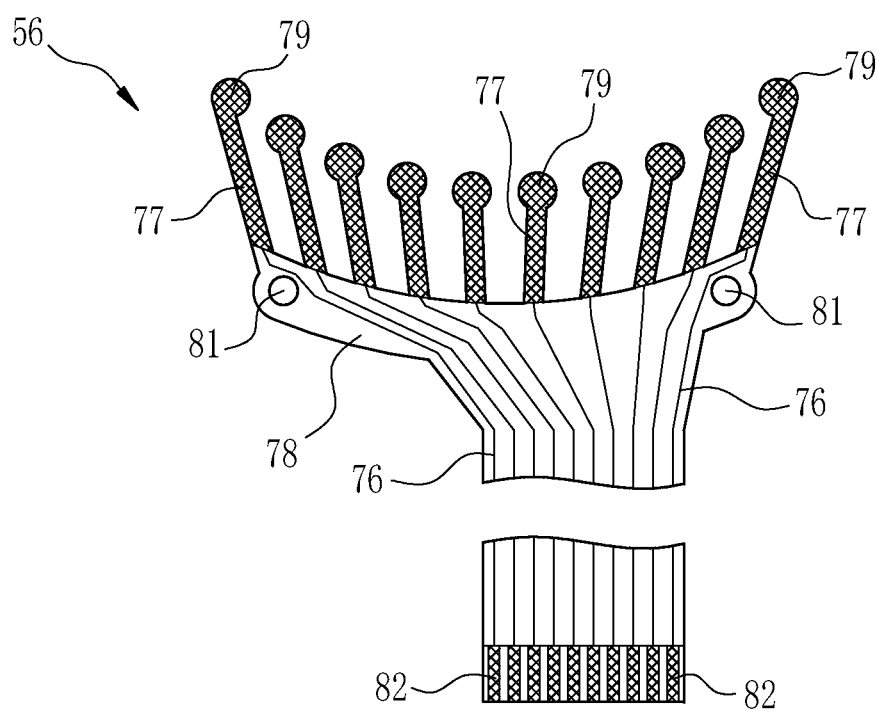
FIG. 6 is a front view of a flexible printed circuit board.

As shown in FIG. 6, a conductive pattern 76, which is used to connect the contact members 53 to the control circuit board (not shown) of the camera body 11, is formed on the flexible printed circuit board 56. A plurality of arm portions 77, which are branched from a base portion 78, are formed at the tip of the flexible printed circuit board 56 so as to correspond to the respective contact members 53. Terminal portions 79, which come into contact with the base end portions 53b of the contact members 53, are formed at the tip portions of the arm portions 77. The conductive pattern 76 is exposed to the arm portions 77 and the terminal portions 79 of the tips of the arm portions 77. Accordingly, when the conductive pattern 76 comes into contact with the base end portions 53b of the contact members 53, the conductive pattern 76 is electrically connected to the contact members 53. Each contact member 53 is displaced between the protruding position and the retracted position, but the flexible printed circuit board 56 can be smoothly displaced in the space formed between the base 51 (the recessed portion 73) and the support member 58 without inhibiting the displacement of each contact member 53 since the arm portions 77 are formed on the flexible printed circuit board 56. Further, since locking holes 81 are formed at the flexible printed circuit board 56, the positional deviation and the falling of the flexible printed circuit board 56 are prevented when the protrusions 74a of the base 51 are inserted into the locking holes 81.

Contacts 82 where the conductive pattern 76 is exposed are formed at the base end of the flexible printed circuit board 56. The contacts 82 are connected to the control circuit board (not shown) built into the camera body 11. For this reason, when the contacts 82 are connected to the control circuit board, the flexible printed circuit board 56 is also a part of wires of the control circuit board.

Meanwhile, the conductive pattern 76 is exposed to the entire arm portions 77 including the terminal portions 79, but the conductive pattern 76 may be exposed to only the tip portions (the terminal portions 79) of the arm portions 77 coming into contact with the contact members 53. Further, the conductive pattern 76 is exposed to only the surface of each of the arm portion 77 and the contact 82 coming into contact with the contact member 53 and the control circuit board, and the conductive pattern 76 is covered with an insulator on the opposite surface thereof. For this reason, for example, the coil spring 57 comes into contact with the surface opposite to the surface of the terminal portion 79, which comes into contact with the contact member 53, at the tip (the terminal portion 79) of the arm portion 77, but the coil spring 57 may be made of a conductive material.

Figure 7:
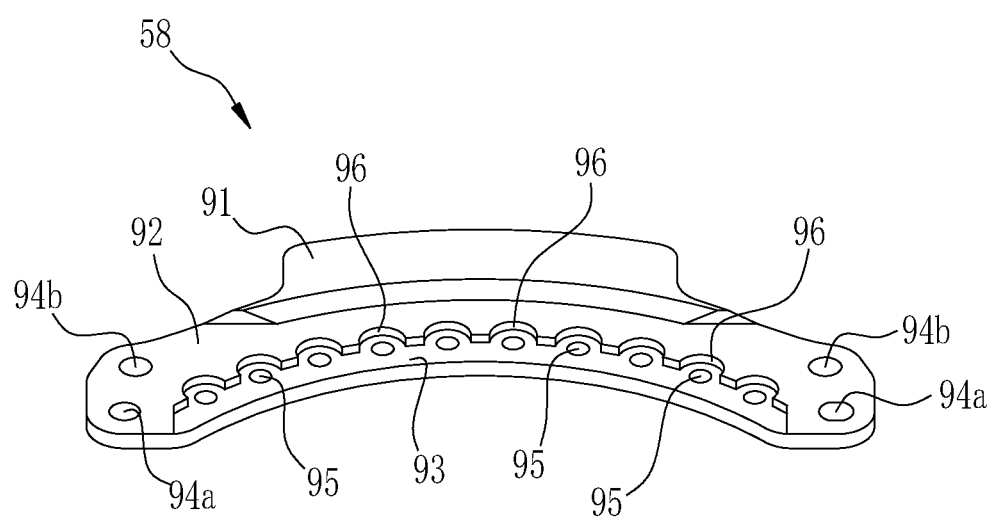
FIG. 7 is a front perspective view of a support member.

As shown in FIG. 7, the support member 58 is a member supporting the coil springs 57, and has a three-stage shape including a base end portion 91 that includes a surface protruding so as to be closest to the base 51, an intermediate portion 92 that protrudes so as to be closer to the rear surface of the camera body 11 than the base end portion 91, and a recessed portion 93 that is formed at the intermediate portion 92.

The flexible printed circuit board 56 is interposed between the base end portion 91 and the convex portion 74 of the base 51. The intermediate portion 92 is provided with first hole portions 94a and second hole portions 94b through which the screws 63 pass, and the locking pins 62 of the base 51 are inserted into the first hole portions 94a, so that the support member 58 is locked to and positioned relative to the base 51. When the screws 63 are inserted into the second hole portions 94b and fastened to the screw holes 64 of the base 51, the support member 58 is fixed to the base 51.

Holes 95 (second holes) are provided in the recessed portion 93 near the intermediate portion 92 at positions corresponding to the contact members 53. The holes 95 are through holes for an assembly jig 102 that is used to assemble the electric contact device 33. However, the diameter of the hole 95 is smaller than that of the coil spring 57 so that the coil spring 57 does not escape from the hole 95. As shown in FIG. 8, the assembly jig 102 is provided with shafts 103 that stand up so as to correspond to the arrangement of the holes 95 and the respective shafts 103 are inserted into the corresponding holes 95. The support member 58 is mounted on the base 51 so that the coil springs 57 are disposed on the respective shafts 103 protruding from the holes 95.

Further, semi-cylindrical guide grooves 96 (second grooves) are formed on a boundary portion between the recessed portion 93 and the intermediate portion 92 at positions corresponding to the contact members 53 and the holes 95. The guide grooves 96 form guides 99 (see FIG. 9), which guide the extension and contraction of the coil springs 57 in the direction perpendicular to the surface of the base 51, together with the guide grooves 71 formed on the base 51. Each of the guide grooves 96 is formed so as to surround a portion of the coil spring 57 between an end of the coil spring 57 close to the support member 58 and an end thereof close to the base 51. The reason for this is that a space in which the flexible printed circuit board 56 is displaced is formed between the base 51 and the support member 58.

Figure 9:
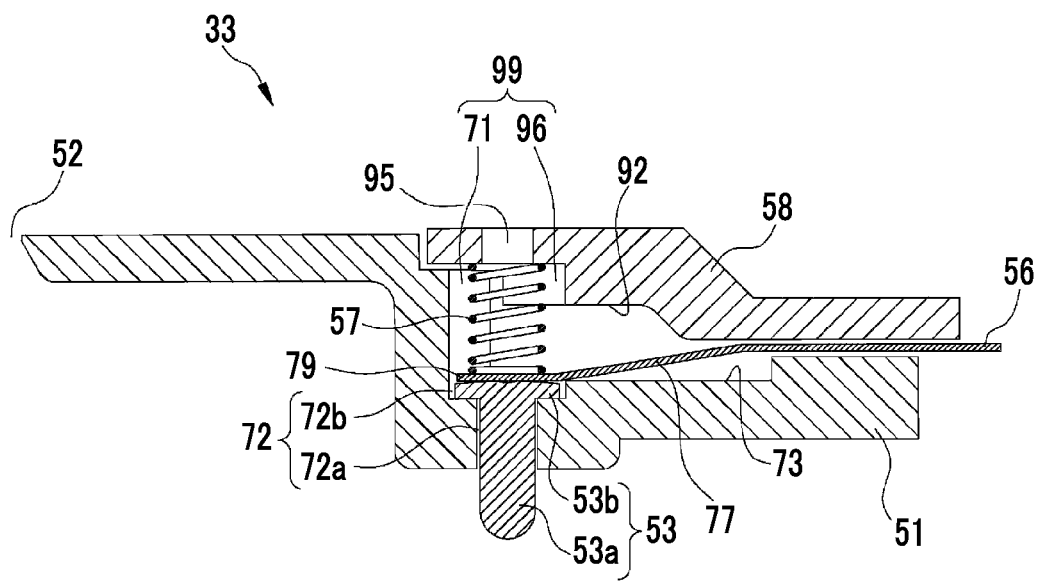
FIG. 9 is a cross-sectional view of the electric contact device when a contact member is present at a protruding position.

When the electric contact device 33 is formed using the base 51, the contact members 53, the flexible printed circuit board 56, the coil springs 57, and the support member 58, the contact member 53, the flexible printed circuit board 56, and the coil spring 57 are interposed between the base 51 and the support member 58 in this order while the contact member 53 is inserted into the hole 72 as shown in FIG. 9. The flexible printed circuit board 56 passes through a space, which is formed by the recessed portion 73 of the base 51 and the intermediate portion 92 of the support member 58, and is inserted into a gap between the contact members 53 and the coil spring 57 from a gap between the guide grooves 96 and the base 51. Further, the position of each hole 95 is present at the center of the guide grooves 71 and 96 that surround the outer periphery of the coil spring 57 close to the support member 58.

The coil spring 57 has elasticity so as to be extended and contracted between the end (one end) thereof close to the base 51 and the end (the other end) thereof close to the support member 58. Since the coil spring 57 biases the terminal portion 79 of the flexible printed circuit board 56 from the other end of the coil spring 57, which is supported by the support member 58, as a base point by the end of the coil spring 57 close to the base 51, the coil spring 57 allows the terminal portion 79 to come into contact with the base end portion 53b of the contact member 53. Accordingly, the conductive pattern 76, which is exposed to the terminal portion 79, and the contact member 53 are electrically connected to each other.

The guide groove 71 of the base 51 and the guide groove 96 of the support member 58 form the guide 99. The guide 99 guides the extension and contraction of the coil spring 57. That is, since the guide 99 surrounds the outer periphery of the coil spring 57, the guide 99 laterally supports the coil spring 57 and suppresses shaking of the coil spring 57 or the bending of the middle of the coil spring 57.

Figure 10:
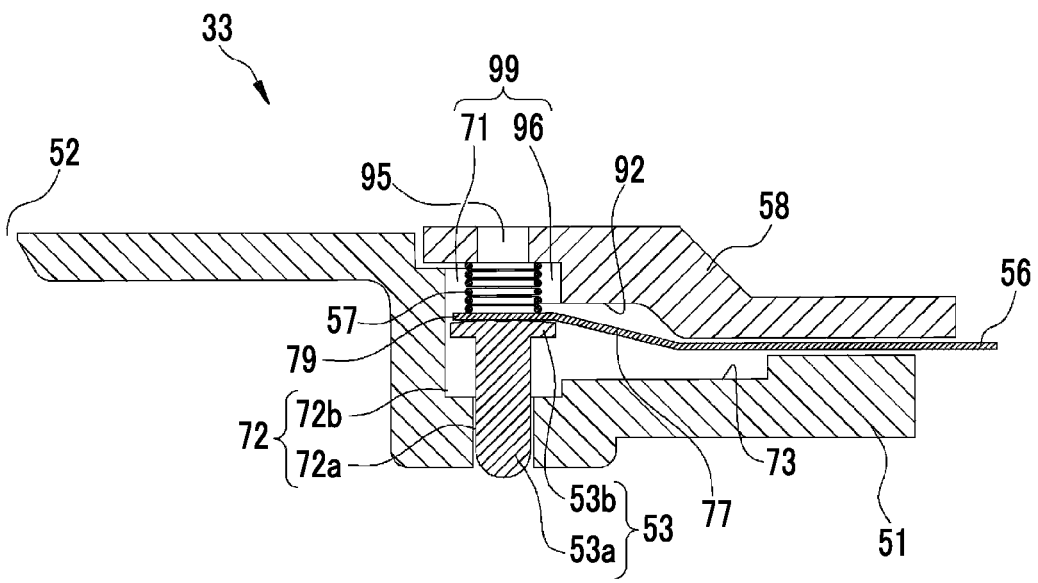
FIG. 10 is a cross-sectional view of the electric contact device when the contact member is present at a retracted position.

For example, when the lens unit 12 is mounted on the camera body 11 and the contact member 53 is pushed from the front side of the base 51 by the lens unit 12 as shown in FIG. 10, the coil spring 57 is compressed and the contact member 53 is displaced along the hole 72 toward the retracted position. Further, the space in which the arm portions 77 of the flexible printed circuit board 56 are displaced is formed between the base 51 and the support member 58 by the recessed portion 73 of the base 51 and the intermediate portion 92 of the support member 58. Accordingly, even though each contact member 53 is displaced to the retracted position (or the protruding position of FIG. 9), the flexible printed circuit board 56 can be displaced without being caught by the base 51 or the support member 58 and can always be kept interposed between the contact members 53 and the coil springs 57.

In the electric contact device 33, as described above, the guides 99 are formed by the guide grooves 71 of the base 51 and the guide grooves 96 of the support member 58, and the extension and contraction of the coil springs 57 are guided by the guides 99. Accordingly, it is possible to reduce a distance between the contact member 53 and the side surface of the lens unit 12. Further, generally, the positions of the contact members 53 are determined for the compatibility with a replacement lens unit. Accordingly, when the distance between the contact member 53 and the side surface of the lens unit 12 is reduced using the electric contact device 33, an insertion space for the lens unit 12 is increased in size and the diameter of the lens 14 available in the lens unit 12 is increased. As a result, the degree of freedom in the design of the lens of the lens unit 12 is improved.

Figure 11:
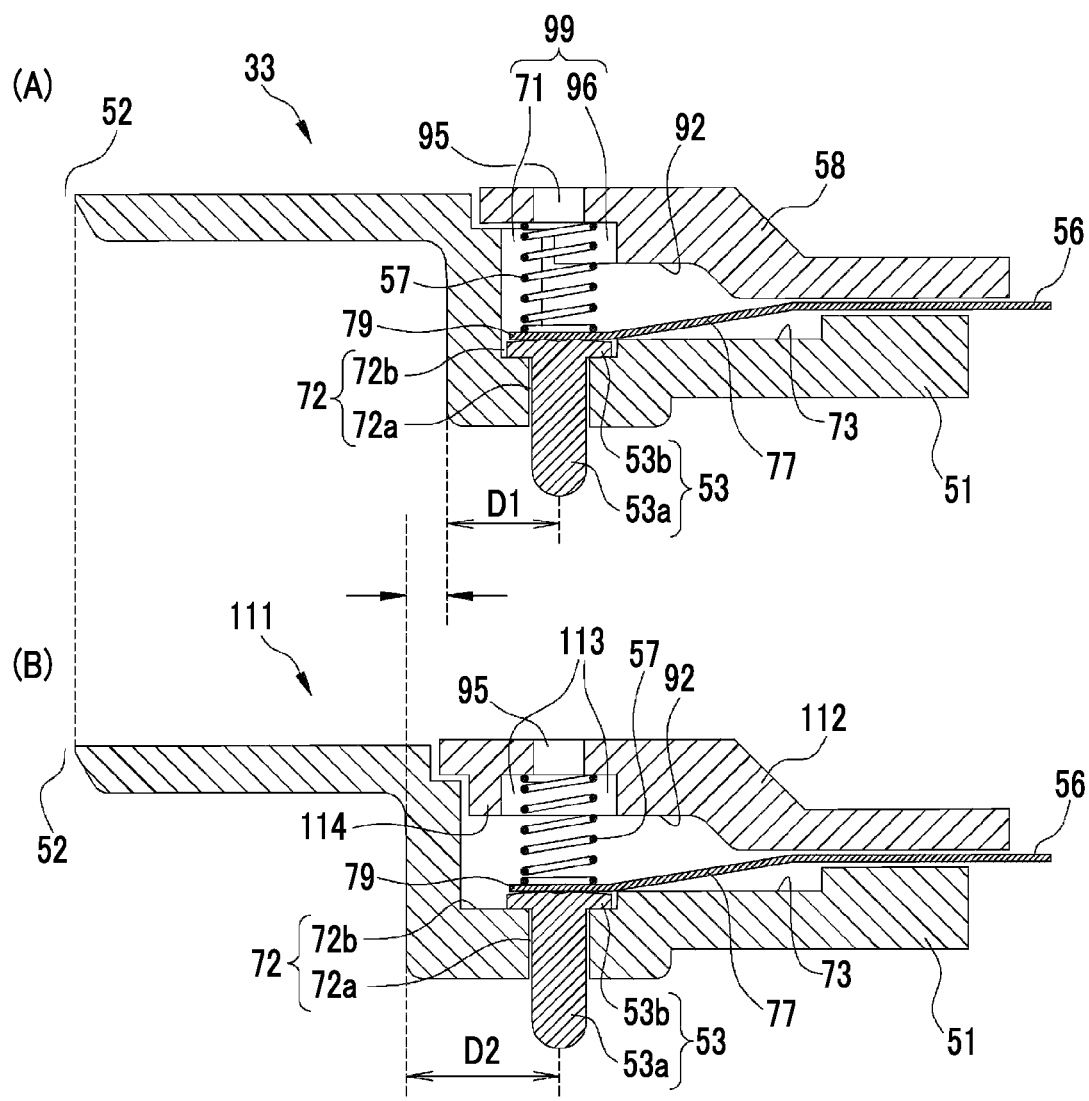
FIG. 11 is a cross-sectional view showing the electric contact device of the present invention and an electric contact device of a comparative example.

For example, as shown in FIG. 11, the electric contact device 33 (FIG. 11A) is compared with an electric contact device 111 (FIG. 11B) of a comparative example in which coil springs 57 are supported by only a support member 112. The electric contact device 111 of the comparative example is formed so as to have the same structure as the electric contact device 33 except that the electric contact device 111 uses a support member 112 in which recessed portions 113 for supporting the coil springs 57 are formed at positions corresponding to the guides 99 of the electric contact device 33.

In this case, since a wall 114 is formed between the coil spring 57 and the base 51 in the recessed portion 113 of the electric contact device 111, a gap, which is substantially equal to the thickness of the wall 114, is formed between the coil spring 57 and the side wall of the base 51. In contrast, since the guide 99 is formed by the guide groove 71 of the base 51 and the guide groove 96 of the support member 58 and the coil spring 57 is guided by the guide 99 in the electric contact device 33, a gap is hardly formed between the coil spring 57 and the side wall of the base 51. For this reason, as shown in FIGS. 11A and 11B by arrows D1 and D2, a distance between the contact member 53 and the side surface of the base 51 (the surface corresponding to the position of the side surface of the inserted lens unit 12) in the electric contact device 33 is shorter than that in the electric contact device 111 of the comparative example by about the thickness of the side wall 114 (D1<D2).

In addition, since a large gap is formed next to the coil spring 57 in the electric contact device 111 of the comparative example, the coil spring 57 bends in the middle thereof without being linearly extended and contracted when the contact member 53 is displaced between the protruding position and the retracted position. In this case, since a force for biasing the flexible printed circuit board 56 by the coil spring 57 or the biasing direction thereof becomes non-uniform, a gap may be formed between the flexible printed circuit board 56 and the contact member 53 and contact may become unstable. However, since about half of the periphery of the coil spring 57 is guided by the guide groove 71 and the posture of the coil spring 57 is maintained in the electric contact device 33, it is possible to prevent the coil spring 57 from being bent toward at least the base 51 and to allow the flexible printed circuit board 56 and the contact member 53 to stably come into contact with each other.

Figure 12:
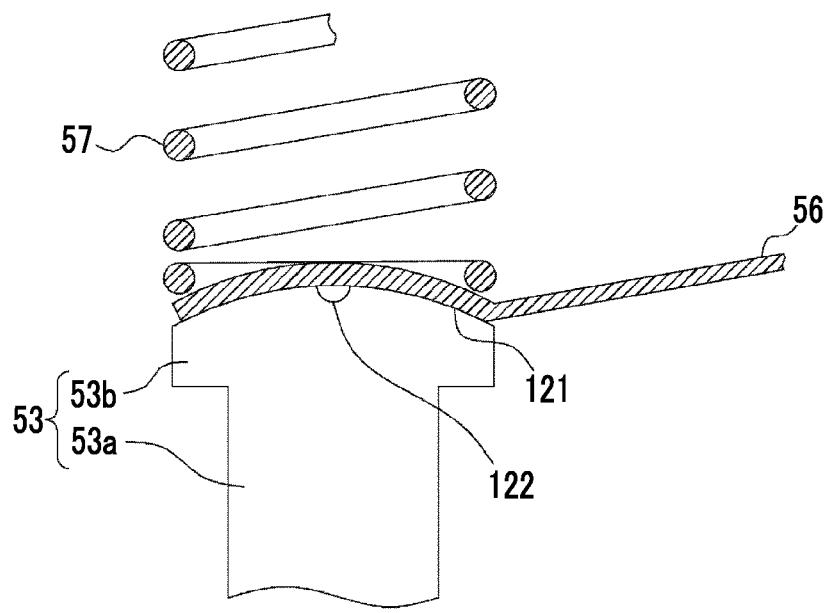
FIG. 12 is a view showing the detailed shape of the contact member.

Meanwhile, when the surface, which comes into contact with the flexible printed circuit board 56, of the contact member 53, that is, the surface of the base end portion 53b is formed of a flat surface, a gap may be formed between the surface of the base end portion 53b and the flexible printed circuit board 56 due to the bending or inclination of the flexible printed circuit board 56 and electrical connection may become unstable. For this reason, it is preferable that the surface, which comes into contact with the flexible printed circuit board 56, of the contact member 53, that is, the surface 121 of the base end portion 53b is formed in the shape of a convex curve protruding toward the flexible printed circuit board 56 as shown in FIG. 12. When the surface 121 of the base end portion 53b is formed in the shape of a convex curve as described above, the flexible printed circuit board 56 is previously bent along the shape of the surface of the base end portion 53b and irregular and temporary bending hardly occurs. Further, even if some inclination occurs, the contact member 53 and the flexible printed circuit board 56 are likely to come into surface contact with each other. For this reason, electrical connection is stable.

Furthermore, it is preferable that a recessed portion 122 is formed at, for example, the center of the base end portion 53b having the shape of a convex shape. When the recessed portion 122 is formed as described above, the biasing force of the coil spring 57 is concentrated on the edge portion of the recessed portion 122 and the flexible printed circuit board 56 is likely to be bent along the shape of the surface of the base end portion 53b. Accordingly, electrical connection is likely to be more stable.

Figure 13:
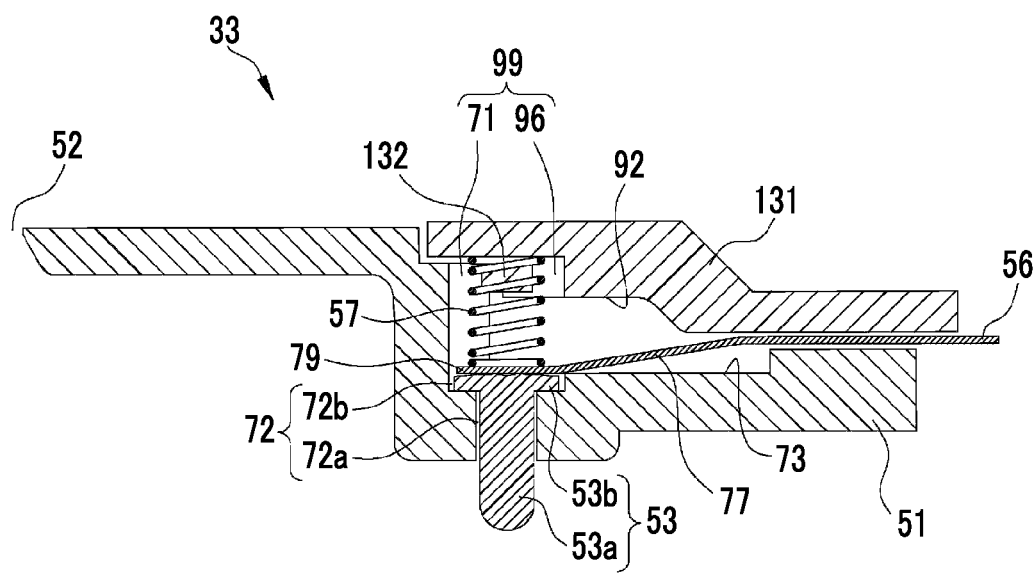
FIG. 13 is a cross-sectional view of an electric contact device including a protrusion portion.

The support member 58 is provided with the holes 95 into which the shafts 103 of the assembly jig 102 are inserted, but a support member 131, which is provided with protrusion portions 132 corresponding to the shafts 103 of the assembly jig 102 and locks the coil springs 57 by the protrusion portions 132 as shown in FIG. 13, may be used instead of the support member 58. When the support member 131 is used, it is easy to assemble the electric contact device 33 even without using the assembly jig 102.

Further, the electric contact device 33 is provided in the camera body 11, but an electric contact device, which has the same structure as the electric contact device 33, may be used as the electric contact device 43 of the lens unit. In this case, it is preferable that an electric contact device of which simple contacts are exposed is used as the contacts provided in the camera body 11.

Figure 14:
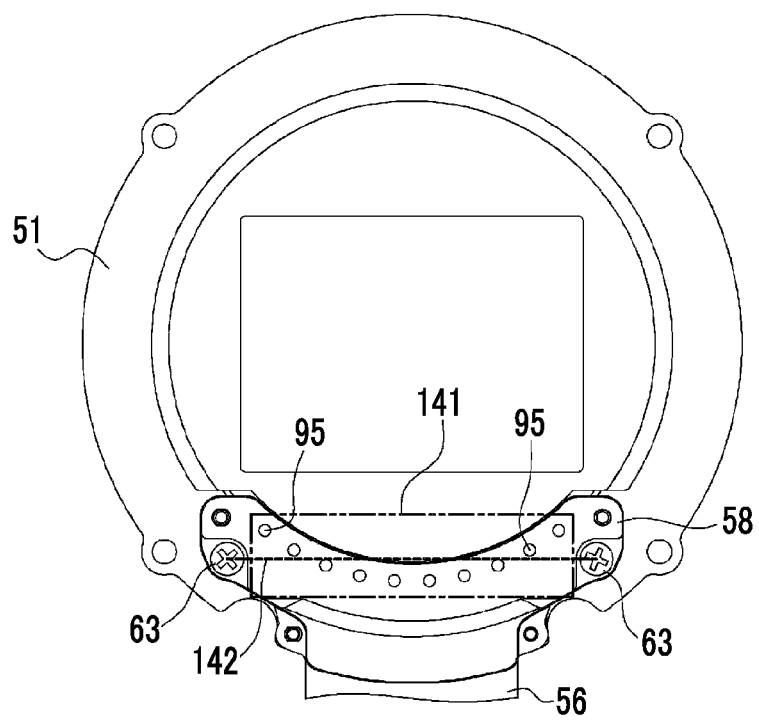
FIG. 14 is a view showing the disposition of screws that fix the support member to the base.

As shown in FIG. 14, the support member 58 is fixed to the base 51 by the contact members 53, the holes 72 of the base 51 into which the contact members 53 are inserted, the coil springs 57, and two screws 63 that are positioned so as to sandwich an arrangement region 141 in which the holes 95 of the support member 58 are arranged therebetween in one direction. It is preferable that the disposition of the screws 63, which fix the support member 58 to the base 51, is determined so that a straight line 142 connecting these screws 63 passes through the arrangement region 141. When the support member 58 is fixed to the base 51 at two portions that are positioned with the arrangement region 141 interposed therebetween in one direction, it is easy to make a load on the coil springs 57, which presses the support member 58, uniform. Accordingly, it is possible to prevent the deformation or bending of the support member 58 and to make a force of each coil spring 57, which biases each contact member 53, uniform. Further, it is particularly preferable that the disposition of the screws 63 is determined so that the straight line 142 passes through the center of the load of the coil springs 57 pressing the support member 58. Meanwhile, the support member 58 may be fixed to the base 51 at three or more portions. In this case, the disposition of the respective fixing portions may be determined so that the centroid of all of the fixing portions passes through the center of the load of the coil springs 57 pressing the support member 58. The support member 58 may be fixed to the base 51 by using members other than the screws 63, a locking structure, or a fitting structure.

It is preferable that the support member 58 is made of a transparent material. The reason for this is that it is easy to check the states of the contact members 53, the flexible printed circuit board 56, and the coil springs 57, which are interposed between the base 51 and the support member 58, through the support member 58 during the assembly of the electric contact device 33 when the support member 58 is transparent.

In the electric contact device 33, the coil springs 57 are used to bias the flexible printed circuit board 56 toward the contact members 53. However, other biasing members, such as leaf springs, may be used instead of the coil springs 57.

The electric contact device 33 is suitably used not only for the electrical connection between the camera body 11 and the lens unit 12 and but also for an arbitrary device in which electrical connection is necessary in a part to be detachably mounted or to be replaced.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electric contact device that electrically connects a camera body to a lens unit, the electric contact device comprising:
    a flexible printed circuit board on which a conductive pattern is formed;
    a contact member that comes into direct contact with the flexible printed circuit board and is electrically connected to the conductive pattern, a surface of the contact member that comes into contact with the flexible printed circuit board being a curved surface;
    a base that includes a first hole holding a first end portion of the contact member so as to allow the first end portion of the contact member to be displaced between a protruding position where the first end portion protrudes and a retracted position where the first end portion is retracted;
    a biasing member that has elasticity so as to be extended and contracted between a first end thereof and a second end thereof, the first end of the biasing member biasing the flexible printed circuit board such that the flexible printed circuit board is bent along the curved surface of the contact member and comes into contact with a second end portion of the contact member;
    a support member that supports the second end of the biasing member; and
    a guide that is composed of a first groove formed on the base and a second groove formed on the support member and guides the extension and contraction of the biasing member.

2. The electric contact device according to claim 1, wherein
    the contact member includes a shaft portion to be inserted into the first hole,
    the first end portion of the contact member has a diameter smaller than a diameter of the first hole, and is formed at a first end of the shaft portion, and
    the second end portion of the contact member has a diameter larger than the diameter of the first hole, and is formed at a second end of the shaft portion.

3. The electric contact device according to claim 1, wherein each of the first and second grooves has a semi-cylindrical shape.

4. The electric contact device according to claim 1, wherein
    the first and second grooves surround an outer periphery of the biasing member close to the second end of the biasing member, and
    the flexible printed circuit board is inserted into a gap between the contact member and the biasing member through a gap between the second groove and the base.

5. The electric contact device according to claim 1, wherein
    the biasing member is a coil spring,
    the support member is fixed to the base, and
    the support member is provided with a second hole, which has a diameter smaller than a diameter of the biasing member, at a center of the first and second grooves that surround an outer periphery of the biasing member close to the second end of the biasing member.

6. The electric contact device according to claim 1, wherein
    the biasing member is a coil spring,
    the support member is fixed to the base, and
    the support member is provided with a protrusion portion at a center of the first and second grooves that surround an outer periphery of the biasing member close to the second end of the biasing member, the protrusion portion protruding inside the coil spring and locking the coil spring.

7. The electric contact device according to claim 1, wherein
    a plurality of the first holes, a plurality of the contact members, a plurality of the biasing members, a plurality of the first grooves, and a plurality of the second grooves are provided, and
    the flexible printed circuit board includes a plurality of terminals that are provided so as to correspond to the respective contact members, a plurality of arm portions that are connected to the respective terminals, and a base portion to which the respective arm portions are commonly connected.

8. The electric contact device according to claim 7, wherein the support member is fixed to the base at first and second fixing portions that are positioned so as to sandwich an arrangement region in which the first holes are arranged therebetween in one direction, and
    a straight line connecting the first and second fixing portions passes through the arrangement region.

9. The electric contact device according to claim 8, wherein the base is formed integrally with a light blocking frame that is provided on the camera body.

10. The electric contact device according to claim 9, wherein
    the lens unit has a cylindrical shape, and
    the first holes are arranged in an arc shape along an outer periphery of the lens unit.

11. The electric contact device according to claim 1, wherein the surface is a convex surface that protrudes toward the flexible printed circuit board, and a recessed portion is formed at an apex of the convex surface.

12. The electric contact device according to claim 1, wherein the support member is made of a transparent material.

13. A lens unit including an electric contact device for electrical connection with a camera body, the electric contact device comprising:
- a flexible printed circuit board on which a conductive pattern is formed;
- a contact member that comes into direct contact with the flexible printed circuit board and is electrically connected to the conductive pattern, a surface of the contact member that comes into contact with the flexible printed circuit board being a curved surface;
- a base that includes a first hole holding the first end portion of the contact member so as to allow the first end portion of the contact member to be displaced between a protruding position where the first end portion protrudes and a retracted position where the first end portion is retracted;
- a biasing member that has elasticity so as to be extended and contracted between a first end thereof and a second end thereof, the first end of the biasing member biasing the flexible printed circuit board such that the flexible printed circuit board is bent along the curved surface of the contact member and comes into contact with a second end portion of the contact member;
- a support member that supports the second end of the biasing member; and
- a guide that is composed of a first groove formed on the base and a second groove formed on the support member and guides the extension and contraction of the biasing member.

14. An imaging device including an electric contact device that electrically connects a camera body to a lens unit, the electric contact device of the camera body or the lens unit comprising:
- a flexible printed circuit board on which a conductive pattern is formed;
- a contact member that comes into direct contact with the flexible printed circuit board and is electrically connected to the conductive pattern, a surface of the contact member that comes into contact with the flexible printed circuit board being a curved surface;
- a base that includes a first hole holding the first end portion of the contact member so as to allow the first end portion of the contact member to be displaced between a protruding position where the first end portion protrudes and a retracted position where the first end portion is retracted;
- a biasing member that has elasticity so as to be extended and contracted between a first end thereof and a second end thereof, the first end of the biasing member biasing the flexible printed circuit board such that the flexible printed circuit board is bent along the curved surface of the contact member and comes into contact with a second end portion of the contact member;
- a support member that supports the second end of the biasing member; and
- a guide that is composed of a first groove formed on the base and a second groove formed on the support member and guides the extension and contraction of the biasing member.

* * * * *